United States Patent [19]
Potter

[11] 3,781,637
[45] Dec. 25, 1973

[54] INRUSH-CURRENT LIMITING DEVICE
[75] Inventor: Geoffrey Potter, Hopkinton, Mass.
[73] Assignee: Honeywell Information Systems Inc., Waltham, Mass.
[22] Filed: Jan. 2, 1973
[21] Appl. No.: 320,038

[52] U.S. Cl. ................................. 321/11, 321/45 S
[51] Int. Cl. .......................................... H02m 1/18
[58] Field of Search........................... 321/11, 45 S

[56] References Cited
UNITED STATES PATENTS

| | | | |
|---|---|---|---|
| 3,334,290 | 8/1967 | Landis | 321/11 |
| 3,678,368 | 7/1972 | Popp | 321/11 |
| 2,596,606 | 5/1952 | Scherer | 321/45 S |
| 2,626,378 | 1/1953 | Levy, Jr. | 321/45 S |
| 3,227,940 | 1/1966 | Gilbert et al. | 321/11 |
| 3,401,327 | 9/1968 | Leppert | 321/45 S |

Primary Examiner—William M. Shoop, Jr.
Attorney—William W. Holloway, Jr. et al.

[57] ABSTRACT

Apparatus, associated with an inverter circuit, for limiting inrush-current into a storage capacitor during an initial charging period, while minimizing the power dissipation of the limiting device during normal inverter operation. A resistive element provides a limiting device for the initial charging period of the storage capacitor. A silicon-controlled rectifier with associated apparatus, placed in a conducting state by the operation of the inverter circuit, provides an alternate low impedance path in parallel with the resistive element following the initial charging period.

25 Claims, 2 Drawing Figures

3,781,637

INRUSH-CURRENT LIMITING DEVICE

BACKGROUND OF THE INVENTION

1. Field of the Invention

This invention relates generally to power supplies and, more particularly, to apparatus in a power supply having an inverter circuit, for limiting a surge of (in-rush-)current during a start-up period while minimizing the continuing power losses due to the apparatus limiting the inrush-current.

2. Description of the Prior Art

Methods for limiting an initial surge of current during the start-up of a circuit, such as a power supply, which requires the charging of a storage capacitor, are known in the prior art. The limiting of the inrush-current is necessary because the storage capacitor, being initially uncharged, is the instantaneous circuit equivalent of short circuit as seen by the input power source. The presence of a short circuit, even momentarily, can result in large current transients, damaging the circuit elements carrying the inrush-current unless the elements are capable of handling high currents. However, elements capable of handling these high currents are expensive, and provide capability that is not required during the major portion of the circuit operation.

It is therefore known in the prior art to provide a resistor between the input power source and the storage capacitor to limit the inrush-current surge into the circuit. However, the continued presence of the resistor provides a continuing source of power loss which, for high power operations, can prove to be unacceptable.

In order to minimize the power loss due to the limiting resistor, a switch can be provided in parallel with the resistor. The switch can be operated either manually or automatically, the automatic operation responding typically to a passage of time, to conditions of the output voltage, or to conditions in the apparatus controlling the operation of the circuit. The switch, when activated, provides an alternative low impedance path for input current during normal operation. The prior art manual and automatic switching apparatus is either unresponsive to potentially damaging fault condition or is unduly complicated.

In circuits in which the above problems are found, an inverter circuit, that is a circuit for changing a DC voltage to an AC voltage, is frequently present. (The operation of an inverter circuit is described in Silicon Controlled Rectifier Manual; F.W. Gutzwiller, Editor; General Electric Company; Auburn, N.Y., 1961, 2nd Edition; or in Semiconductor Controlled Rectifiers: Principles and Applications of p-n-p-n Devices, F.E. Gentry, F.W. Gutzwiller, N. Holonyak, Jr., and E.E. Von Zustraw; Prentice-Hall, Inc.; Engle Wood Cliffs, New Jersey; 1964.) The presence of the inverter circuit allows use of an inrush-current limiting device which provides a solution for the above-discussed problems.

OBJECTS

It is therefore an object of the present invention to provide an improved power supply.

It is a further object of the present invention to provide for limiting the inrush-current into a storage capacitor.

It is a still further object of the present invention to provide a resistor for limiting the current surging into a storage capacitor during start-up of the circuit while providing an alternate low impedance path during the circuits, normal operation.

It is another object of the present invention to provide simple apparatus for by-passing a limiting circuit element during normal operation of an associated inverter circuit.

It is still another object of the present invention to provide a simple inrush-current limiting device for a power supply containing an inverter circuit.

These and other features of the invention will be understood upon reading of the following description together with the drawings.

SUMMARY OF THE INVENTION

The aforementioned and other objects of the present invention are accomplished by providing an electronic switch in parallel with the impedance limiting the current initially charging a storage capacitor. The electronic switch provides an electrical path for by-passing the limiting impedance during normal operation of an inverter circuit.

The electronic switch is a silicon-controlled rectifier (SCR) coupled in parallel with the limiting resistor. The gate terminal of the SCR is coupled to the inverter circuit. The operation of the inverting apparatus provides a continuously renewed bias of the SCR gate terminal relative to the SCR cathode terminal resulting in continuing the conducting state of the SCR during normal inverter operation.

DESCRIPTION OF THE PREFERRED EMBODIMENT

Description of the Apparatus

Figure 1:
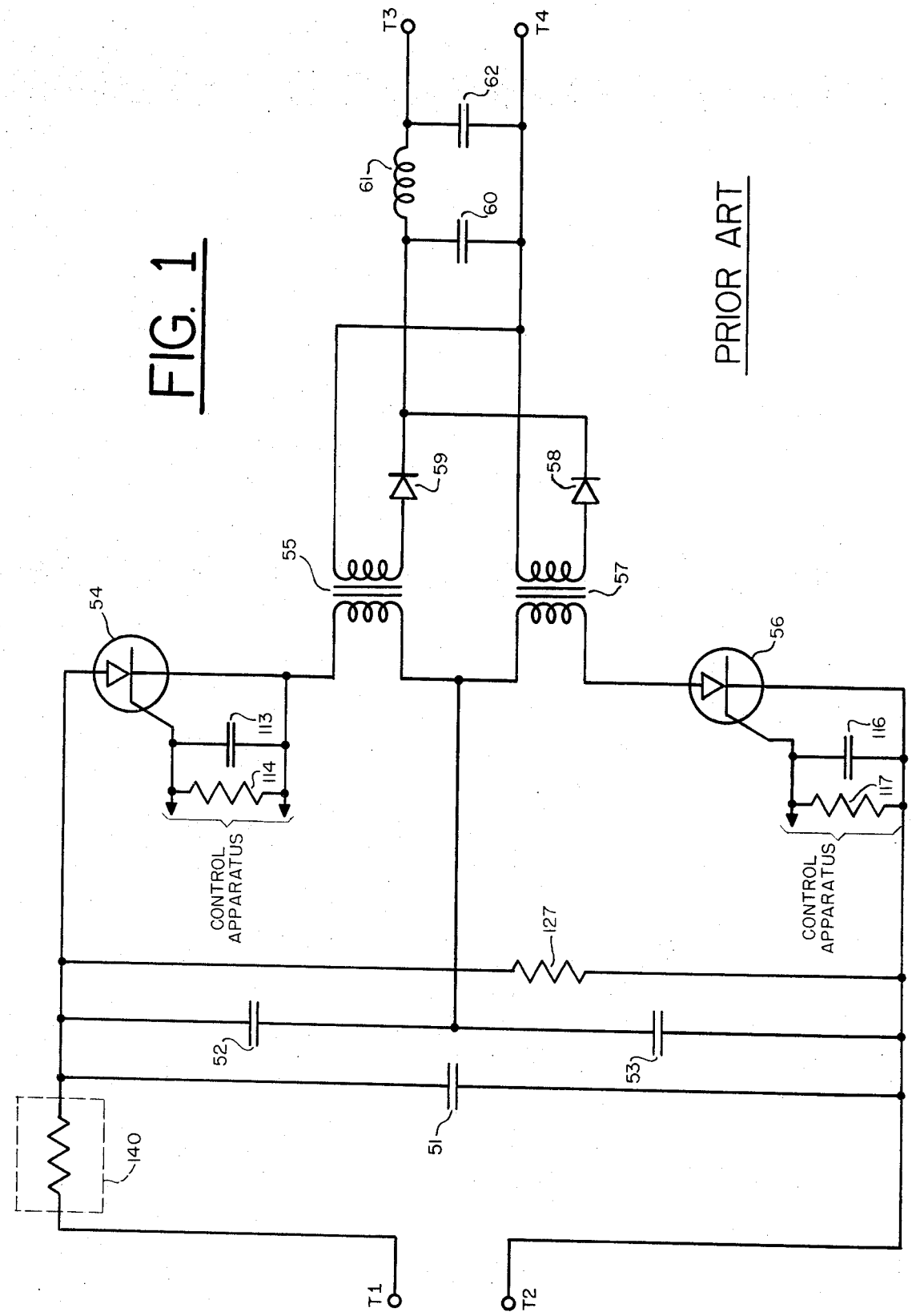
FIG. 1 is a schematic circuit diagram of a power supply, containing associated inverter circuitry, with a typical inrush-current limiting impedance according to the prior art.

Referring now to FIG. 1, terminal T1 and terminal T2 receive power from an input power source. The input power source typically supplies rectified, but unregulated voltage to terminals T1 and terminal T2. Terminal T1 is coupled to a first terminal of impedance 140. Impedance 140 provides the inrush-current limiting device for the power supply and is shown as a resistor in FIG. 1. A second terminal of impedance 140 is coupled to terminal T2 through capacitor 51 and resistor 127, connected in parallel. Capacitor 51 is the storage capacitor of the power supply, while resistor 127 provides an electrical path for a slow discharge of the capacitor 51, such as when the power supply is switched off. Resistor 127 is commonly called a bleeder resistor.

The second terminal of the impedance 140 is also coupled to an anode of SCR 54. The cathode of SCR 54 is coupled to one terminal of a primary winding of a transformer 55. A second terminal of the primary winding of transformer 55 is coupled, through capacitor 52, to the second terminal of impedance 140. A gate terminal of SCR 54 is coupled through resistor 114 and capacitor 113, connected in parallel, to the cathode of SCR 54. The gate terminal and the cathode terminal of SCR 54 are also coupled to control apparatus.

A first terminal of the secondary winding of transformer 55 is coupled to terminal T4. A second terminal of the secondary winding of transformer 55 is coupled to the anode of diode 59. A cathode of diode 59 is coupled through capacitor 60 to terminal T4, and through inductance 61 to terminal T3. Terminal T3 is also coupled to terminal T4 through capacitor 62. In the preferred embodiment, transformer 55 has more than one secondary winding, and in that event, each first terminal of the secondary windings is coupled to terminal T4, while each second terminal of the secondary windings of transformer 55 is coupled through diodes in parallel to diode 59 to the first terminal of inductance 61.

A second terminal of the primary winding of transformer 55 is coupled through capacitor 53 to terminal T2, and to a first terminal of a primary winding of transformer 57. A second terminal of the primary winding of transformer 57 is coupled to an anode of SCR 56. The cathode of SCR 56 is coupled to terminal T2, the gate terminal of SCR 56 is coupled through resistor 117 and capacitor 116, connected in parallel, to the cathode of SCR 56. The gate element and the cathode element SCR 56 are also coupled to the control apparatus.

A first terminal of a secondary winding of transformer 57 is coupled to terminal T4 while a second terminal of the secondary winding of transformer 57 is coupled to a anode of diode 58. The cathode of diode 58 is coupled to inductance 61. Transformer 57 can have more than one secondary winding. A first terminal of each secondary winding is in that event, coupled to terminal T4, while a second terminal of each secondary winding of transformer 57 is coupled through diodes, connected in parallel to diode 58 to inductance 61.

In the prior art, a manually operated switch, or an electrically operated switch controlled by the status of either the control apparatus or the output voltage across terminals T3 and T4, can be connected across impedance 140 in order to bypass that element during normal operation of the power supply.

Figure 2:
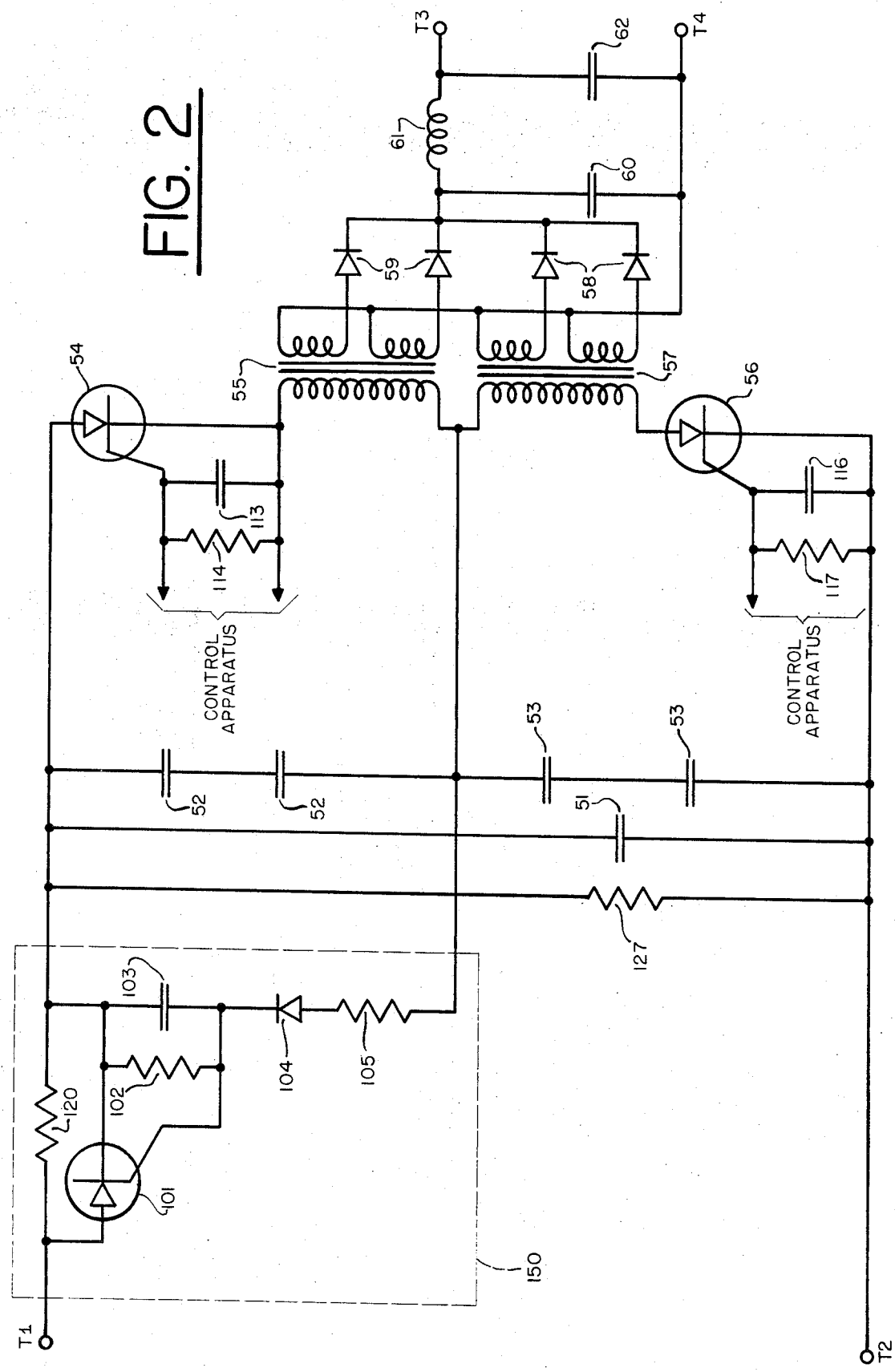
FIG. 2 is a schematic circuit diagram of the power supply of FIG. 1 with the addition of the inrush-current limiting device of the present invention.

Referring now to FIG. 2, the additional apparatus necessary, according to the present invention, to by-pass the inrush-current limiting device, is shown. In FIG. 2, resistor 120 provides the inrush-current limiting device during the initial charging of capacitor 51. Terminal T1 is coupled to an anode element of SCR 101. The cathode terminal of SCR 101 is coupled to a second terminal of resistor 120. Thus when SCR 101 is in a conducting state the resistor 120 is effectively short-circuited. The gate terminal of SCR 101 is coupled to the cathode terminal of SCR 101 through resistor 102 and capacitor 103, connected in parallel. The gate terminal of SCR 101 is coupled also to a cathode terminal of diode 104. The anode of diode 104 is coupled through resistor 105 to the second terminal of the primary winding of transformer 55. Resistor 120, resistor 105, resistor 102, diode 104 capacitor 103 and SCR 101 comprise the inrush-current limiting device and are labelled 150 in FIG. 2.

Operation of the Preferred Embodiment

Referring once again to FIG. 1, the input unregulated power source is coupled between terminal T1 and terminal T2 with the positive polarity at T1. Current flows through impedance 140 and charges capacitor 51. The control apparatus then biases SCR 54, so that this element becomes conducting and charge stored on capacitor 52 is discharged through the primary winding of transformer 55. (A detailed description of the operation of control apparatus for a power supply similar to that found in FIG. 1 and FIG. 2 is found in Patent application Ser. No. 320,041, assigned to the assignee of the instant Invention.) The control apparatus provides a relatively brief biasing voltage before being removed by the control apparatus. The inductive nature of transformer 55 causes an amount of charge to be transferred to capacitor 53 in excess of the quantity of charge originally stored on capacitor 52. When the current flowing through SCR 54 in the positive direction becomes sufficiently small, SCR 54 becomes non-conducting in the absence of a biasing signal. The current through the primary winding of transformer 55 causes current to flow through the secondary circuit of transformer 55. Elements 60, 61 and 62 provides a filter for this current rectified through diode 59. A DC voltage is thus applied between terminals T3 and T4.

After SCR 54 stops conducting, the control apparatus provides a positive pulse to the control gate of SCR 56 relative to the cathode element of SCR 56. Thus, SCR 56 becomes conducting and capacitor 53 is discharged through the primary winding of transformer 57. Accordingly, current flowing in the secondary winding of transformer 57 provides additional, current through diode 58, for the filter coupled to the output of that transformer. Thus, additional current is contributed for maintaining the voltage across terminals T3 and T4. By alternately switching SCR 54 and SCR 56 to the conducting state with a high repetition rate, the ripple voltage across terminals T3 and T4 can be made small.

The operation of a power supply opertion in the manner described above is called a DC to DC converter (cf Silicon Controlled Rectifier Manual or Semiconductor Controlled Rectifiers, cited supra).

Referring next to FIG. 2, while charge is being stored on capacitor 51, the current is limited by resistor 120, SCR 101 being in a non-conducting state. With the operation of the inverter circuit comprising SCR 54 and SCR 56, the voltage applied to the gate terminal relative to the cathode terminal of SCR 101 becomes positive, causing SCR 101 to assume a conducting state and thereby by-passing resistor 120. Each time SCR 54 becomes conducting thereafter, a positive voltage is applied to gate terminal relative to the cathode terminal of SCR 101, causing SCR 101 to be in the conducting state.

The resistor 102 and resistor 105 are in a series circuit when the gate terminal becomes positive relative to the cathode terminal of SCR 101. Thus, resistor 102 and resistor 105 provide a resistance dividing network protecting the gate terminal of SCR 104 from exceeding to high voltage difference relative to the cathode terminal of SCR 101. Diode 104 prevents current from flowing in a reverse direction from the gate terminal of SCR 101.

The presence of capacitor 103 provides a means for maintaining positive voltage on the gate terminal relative to the cathode terminal of SCR 101 during the interval between consecutive conducting states of SCR 54. Further if a ripple voltage across terminals T1 and T2 is large, but occurs with a frequency slow compared to the operation of the inverter circuit, the elements may be chosen for SCR 101 to remain conducting for a time determined by consecutive peaks of the ripple voltage.

In the above described embodiment an inductive load was provided for the SCR 54 and SCR 56 by a transformer. It is clear that inductive impedances can be used in place of these two transformers. In case that an inductive load is used, a transformer, preferrably with a relatively low power drain may be coupled between terminal T2 and the coupling between the two inductive elements replacing transformer 55 and transformer 57. (The detailed operation of such a power supply is described in co-pending Patent application Ser. No. 320,047, assigned to the assignee of the instant Invention). An important feature is that the reactive nature of the impedance in series with the SCR (54) provides an excess amount of charge to be transferred between capacitors, permitting the gate terminal of SCR 101 to become positive periodically relative to the cathode element. When SCR 54 is not alternating between the conducting and the non-conducting state, the positive voltage between the gate terminal and the cathode terminal of SCR 101 will not be maintained and the silicon-controlled rectifier will become non-conducting when a sufficiently low current flows between the anode and the cathode element.

The suspension of operation of the inverter circuit, as for example with the detection of a fault condition by the control apparatus, provides for the removal of the biasing voltage for SCR 101. Thus SCR 101 can assume a non-conducting state and reinstatement of resistor 120 in series with the input power source provides circuit element protection. The gate terminal of SCR 101 is coupled directly to the inverter circuit and complex feedback apparatus such as required when the SCR 101 is coupled to other portions of the power supply are eliminated.

The above description is included to illustrate the operation of the preferred embodiment and is not meant to limit the scope of the invention. The scope of the invention is to be limited only by the following claims. From the above discussion, many variations will be apparent to one skilled in the art that would yet be encompassed by the spirit and scope of the invention.

What is claimed is:

1. An electrical power supply comprising:
   a current limiting resistor coupled to a first power supply input terminal;
   a first storage capacitor coupled between said current limiting resistor and a second power supply input terminal;
   a second storage capacitor coupled to said first storage capacitor;
   means for charging said second storage capacitor comprising a first inductive impedance and a first electronic switch coupled in series with said first inductive impedance, said charging means coupled between said current limiting resistor and said second capacitor, said charging means operating in response to a first control signal;
   means for discharging said second storage capacitor comprising a second inductive impedance and, a second electronic switch coupled in series, said discharge means coupled between said second capacitor and a second power supply input terminal, said discharge means operating in response to a second control signal;
   means for controlling said charging means and said discharging means, said control means producing alternately said first control signal and said second control signal;
   means for producing a rectified and filtered output signal, said output means coupled to at least one of said first and said second inductive impedance; and
   a third electronic switch coupled in parallel with said current limiting resistors said third electronic switch coupled to said second storage capacitor, said third electronic switch being conductive during a charging of said second storage capacitor.

2. The power supply of claim 1 further comprising:
   means for maintaining said third electronic switch in a conducting state for a preselected time after a charging of said storage capacitor.

3. The power supply of claim 2 wherein said third electronic switch includes a silicon-controlled rectifier and wherein a gate terminal of said silicon-controlled rectifier is coupled to said second storage capacitor.

4. The power supply of claim 3 further including:
   a third storage capacitor coupled to said first storage capacitor and said second storage capacitor, said third storage capacitor being alternately charged and discharged out of phase with said second capacitor.

5. The power supply of claim 4 wherein said conducting state maintenance means is a third capacitor coupled between said gate terminal and a cathode terminal of said silicon-controlled rectifier.

6. The power supply of claim 5 wherein a first resistor is coupled between said gate terminal and said cathode terminal, and wherein a second resistor connected in series with a diode is coupled between said gate terminal of said silicon-controlled rectifier and said second storage capacitor.

7. The power supply of claim 6, wherein said control means monitors said output signal, an interval of time between said first and said second control signals determined by said output signal.

8. A electrical power supply comprising:
   a first resistor having one terminal coupled to a first power supply input terminal;
   a first capacitor coupled to said first resistor and coupled to a second power supply input terminal;
   a first silicon-controlled rectifier (SCR), an anode terminal of said first SCR coupled to said first resistance,
   a first inductive impedance coupled to a cathode of said first SCR;
   a second SCR coupled to said second input terminal;
   a second inductive impedance coupled between said first inductive impedance and second SCR;
   a second capacitor coupled between said first and said second inductive impedance, and coupled to said second input terminal;
   a third SCR, an anode terminal of said third SCR coupled to said first input terminal, a cathode element of said third SCR coupled to a said anode terminal of said first SCR, a gate terminal of said third SCR coupled to said cathode terminal of said third SCR through a second resistor and a third capacitor connected in parallel, said gate terminal of said third SCR further coupled to said second capacitor through a third resistor and a diode connected in series;
   means for controlling said first and said second SCR, said first SCR becoming conductive during a first portion of a cycle for said control means, whereby said second capacitor becomes charged, said control means causing said second SCR to become conductive during a second portion of said control means cycle, whereby said second capacitor is discharged; and means for producing an output signal one of said first and said second SCR coupled to at least one inductive impedance, said output signal produced in response to signal changes across said inductive impedance.

9. The power supply of claim 8 wherein control means is coupled to said output signal, said output signal determining an interval for said control means cycle.

10. A power supply comprising:
means for producing a rectified output signal from a time-varying secondary signal;
means for producing a time-varying primary signal, said primary signal means coupled to said output signal means for producing said secondary signal;
an input impedance for limiting current into said power supply, said input impedance coupled to said primary signal means; and
means for by-passing said input impedance, said by-pass means directly coupled to said primary signal means, wherein said by-pass means is activated by primary signal.

11. The power supply of claim 10, wherein said primary signal means comprises at least one inductive impedance and at least one electronic switch connected in series, wherein charging of conductive and non-conductive states of said electronic switch causes said time-varying primary signal.

12. The power supply of claim 11 further comprising a capacitor coupled to said primary signal means, wherein charging and discharging of said capacitor is produced by changing of said state of conduction of said silicon-controlled rectifier.

13. The power supply of claim 12 further including means for controlling said electronic switch, said control means coupled to said output signal, wherein said output signal controls a rate of change of said states of conductivity of said electronic switch.

14. An improved circuit of the type having a resistor which limits current flowing into a first capacitor, and having a second capacitor, said second capacitor being alternately charged through a first inductive impedance and discharged through a second inductive impedance, wherein the improvement comprises:
a switching device coupled in parallel with said resistor, wherein a control terminal of said switching device is coupled to said second capacitor, wherein a charging of said second capacitor causes said switching device to assume a conducting state.

15. The improved circuit of claim 14 wherein the improvement further comprises:
means for maintaining said switching device in a conducting state for at least a preselected time after charging of said second capacitor.

16. The improved circuit of claim 15 wherein said switching device is a silicon-controlled rectifier and wherein said control terminal is a gate terminal of said silicon-controlled rectifier.

17. The improved circuit of claim 16 wherein said means for maintaining said silicon-controlled rectifier in said conducting state comprises a capacitor coupled between said gate terminal and a cathode terminal of said silicon-controlled rectifier.

18. The improved circuit of claim 17 wherein said gate element is coupled through a first control resistor to said cathode terminal and is further coupled through a second control resistor to said second capacitor, said first and second control resistor forming a resistance dividing network for protection of said silicon-controlled rectifier.

19. The improved circuit of claim 18 wherein said silicon-controlled rectifier gate is coupled through a diode to said second capacitor, said second diode preventing a reverse current from flowing from said gate terminal.

20. In a circuit in which a state of at least one electronic switch is rendered alternatively conducting and non-conducting, wherein changed in said electronic switch state cause a varying current in an inductive element, said current composed of charge extracted from a storage capacitor, said current applied to an output circuit, wherein said output circuit provides a steady output voltage in response to said varying current, an input device comprising:
a resistor coupled between said storage capacitor and an input power source, said resistor limiting current flowing from said power source to said capacitor, and
a silicon-controlled rectifier (SCR) coupled in parallel with said resistor, a gate of said SCR coupled to said inductive element, wherein said varying current causes said SCR to assume a conducting state.

21. The circuit of claim 20 wherein said gate is coupled to said inductive element through a first control resistor and a diode and wherein said gate is coupled to a cathode of said SCR through a capacitor and a second control resistor, said capacitor and said second control resistor connected in parallel, wherein said capacitor causes said SCR to remain in a conducting state for a preselected time after an alternation in said state of said electronic switch, and wherein said first and second control resistors prevent excessive voltage between said gate and said cathode.

22. A circuit comprising:
a storage capacitor;
a limiting resistor coupled to said storage capacitor for limiting current flowing into said storage capacitor;
a switch element coupled in parallel with said limiting resistor, wherein activation of said switch element causes said switch element to be in a conducting state, said conducting state of said switch element providing an electrical path for by-passing said limiting resistor; and
an inverter circuit for changing a DC signal to an AC signal, said inverter circuit coupled to said storage capacitor, wherein said storage capacitor provides said DC signal to said inverter circuit, said inverter circuit coupled to said switch element, wherein operation of said inverter circuit causes said switch element to be in said conducting state.

23. The circuit of claim 22 wherein said switch element includes a silicon-controlled rectifier, wherein a gate terminal of said SCR is coupled to said inverter circuit.

24. The circuit of claim 23 wherein said switch element further comprises a capacitor coupled between said gate terminal and a cathode terminal of said silicon-controlled rectifier, said capacitor providing biasing means for maintaining said switch element in a conducting state for a preselected period of time after an operation of said inverter circuit.

25. The circuit of claim 24 wherein said switch element further comprises a first resistor coupled between said gate terminal and said cathode terminal and wherein said switch element further comprise a second resistor and a diode couple between said gate terminal and said inverter circuit.

* * * * *

UNITED STATES PATENT OFFICE
CERTIFICATE OF CORRECTION

Patent No. 3,781,637　　　　　　　　　Dated December 25, 1973

Inventor(s) Geoffrey Potter

It is certified that error appears in the above-identified patent and that said Letters Patent are hereby corrected as shown below:

Column 8, line 17, delete "changed" and insert --changes--.

Signed and sealed this 21st day of May 1974.

(SEAL)
Attest:

EDWARD M. FLETCHER, JR.　　　　　　　　C. MARSHALL DANN
Attesting Officer　　　　　　　　　　　Commissioner of Patents